T. C. COYKENDALL.
ELECTROMAGNETIC RECEIVER.
APPLICATION FILED OCT. 17, 1907.
1,069,922.
Patented Aug. 12, 1913.
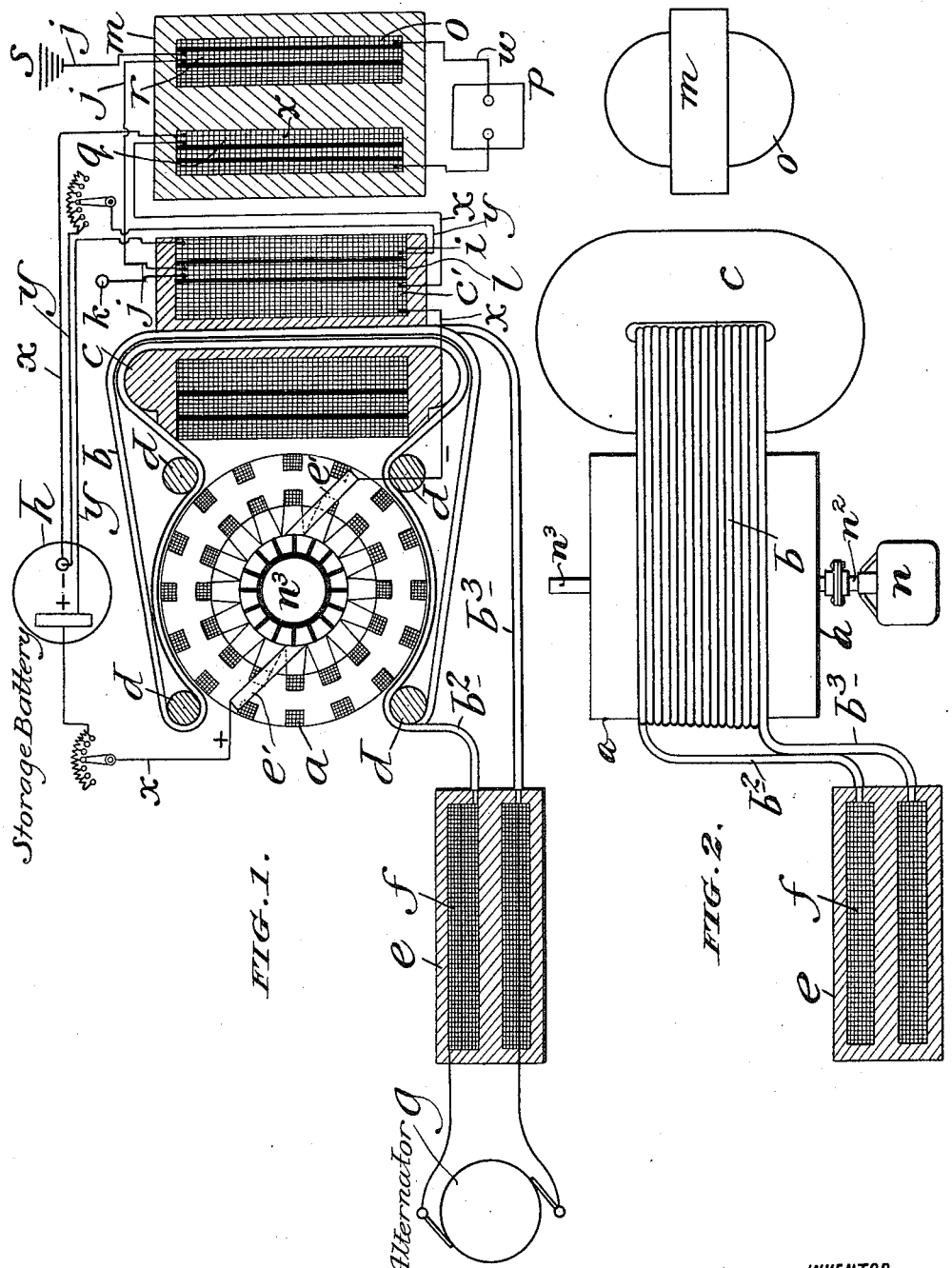
WITNESSES
M. E. Doody
C. E. Mulcany
INVENTOR,
Thomas C. Coykendall
BY
Edgar Tate & Co.
ATTORNEYS

UNITED STATES PATENT OFFICE.

THOMAS C. COYKENDALL, OF KINGSTON, NEW YORK.

ELECTROMAGNETIC RECEIVER.

1,069,922.

Specification of Letters Patent.

Patented Aug. 12, 1913.

Application filed October 17, 1907. Serial No. 397,830.

*To all whom it may concern:*

Be it known that I, THOMAS C. COYKENDALL, a citizen of the United States, and residing at Kingston, in the county of Ulster and State of New York, have invented certain new and useful Improvements in Electromagnetic Receivers, of which the following is a specification, such as will enable those skilled in the art to which it appertains to make and use the same.

My invention relates to electro-magnetic receivers and has for its object to produce a device in which a feeble current or manifestation of electricity may be received and indicated.

I will describe the invention with special reference to cable receivers and relays, but would have it expressly understood that I do not mean to thereby limit myself to such use but desire to have the invention construed as broadly as the state of the art will permit.

The invention is fully disclosed in the following specification, of which the accompanying drawing forms a part, in which the separate parts of my improvement are designated by suitable reference characters in each of the views, and in which;—

Figure 1 is a diagrammatic view of a cable receiver or relay hereafter referred to as a cable relay in which my invention is embodied, part of the construction being in section; and Fig. 2 a diagrammatic plan, perspective and sectional view of the main parts of the apparatus shown in Fig. 1, and showing means for turning or rotating the armature or movable coil of the apparatus.

I will first describe the parts nakedly and will then set forth their functions and effects.

In the drawing; $a$ indicates a suitable armature of a constant current generator. This armature is driven at a uniform speed. The field of the armature is comprised by a continuous iron wire $b$ wound through a magnet spool $c$ and over and around rods or guides $d$. This iron wire $b$ passes to a transformer $e$ and is connected in circuit with a copper wire which constitutes the secondary element or winding of the transformer. The primary element or winding is constituted by the coil $f$ which is connected to a source of alternating electromotive force $g$ so that in addition to the magnetizing effect imparted to the iron by the magnet spool $c$, as will be hereinafter explained, this wire is also traversed by an alternating electric current in order to diminish the hysteretic effect in the iron or other material of the magnetic field due to the vibration of the molecules of the iron by the alternating current. The current is preferably as large as can be used without heating the wire.

The object of circulating an alternating current through the field is to put the molecules of the iron in vibration in planes which are perpendicular to the direction in which it is desired to produce magnetic induction. This vibration effect leaves the molecules free to obey any magnetic force which has a component perpendicular to their planes of vibration.

The alternating magnetic flux in the wire diminishes the hysteretic effect in the wire which links the coil $c$ by reason of the fact that the molecules of the iron are in vibration, hysteresis being retentivity of the magnet flux, and the effect of the alternative current is not to cause hysteresis but to produce currents of electricity which are called hysteretic currents.

The magnetic spool $c$ is compound wound, as will be explained. In the system shown in the drawing the inner coil $c^1$ is in series to the brushes of the armature $a$ and in circuit with a source of electromotive force $h$ preferably a storage battery as will be seen by following the circuit $x$. This battery of course, serves to impart the initial excitation to the field. The outside coil $i$ derives current from the battery and as previously stated the coil $c^1$ is in series to the brushes of the armature $a$ and in circuit with the storage battery $h$. The conditions are such that under normal conditions of operation the current from the armature and a current from the storage battery are balanced as nearly as possible within the limitation of electrical and mechanical working. Thus the coil $c^1$ is in a condition of electrical balance. The outside coil $i$ opposes the effect of the flow of current in the inner coil $c^1$ and is so proportioned and arranged as to bring about a magnetic flow through the material of the field up to a point where the iron is free from hysteresis.

By electrical balance as here used is meant that the electro-magnetic force of the armature $a$ is equal and opposite to that of the battery $h$. When the core wires $b$ are traversed by an alternating current of electricity and in addition are traversed by a magnetic flux which passes through the armature; they become free from hysteresis when the magnetic flux becomes greater than a certain amount, which amount is determined by the nature of the iron of which the wires are composed.

It will of course be understood that suitable rheostats may be employed to maintain the relations mentioned.

The third coil on the magnet spool is the cable coil, that is to say, a wire $j$ is extended from the cable $k$ and connects with the middle winding $l$ of the magnet spool.

It will be readily understood that under the conditions named when the machine is running the slightest flickering or electrical change in the current or condition of the cable will cause an electrical unbalancing of the coils $c^1$ and $i$ and that the generator will be correspondingly and equally affected but by reason thereof enormously multiplying the slight change. Not only this, but the current in the cable need not be interrupted nor the cable allowed to discharge as the minutest change in the cable current or condition will produce the most extraordinary building up or depression as the case may be, in the generator and consequently the generator current will fluctuate in the same manner as the current or electrical condition of the cable, but to a much greater extent on account of the multiplying effect on the generator.

It will be understood that as the magnetic field of the machine has been brought to a point of saturation where it is substantially free from hysteresis the field is in a highly receptive condition. In order, however, to further this object the field is traversed by an alternating current, as hereinbefore explained, by which the molecular structure is put in a neutral condition. The main purpose of employing this alternating current is to render a non-hysteretic field neutral and to leave said field in the highest possible condition of susceptibility.

Before passing to the other feature of my invention I would say that several relays may be used, the armature and its coil of one relay being connected to the "cable coil" of another relay which, of course, at this time is not connected to a cable so that the changes in the original current in the machine connected to the cable will in turn and like manner be multiplied by the second machine, and so on. It will, therefore, be perfectly obvious that with a low resistance series coil see coil $c^1$, the speed of cable transmission will be enormously increased by my invention as the minutest changes in current or condition will effect the delivery of a signal and it will not be necessary either to break the circuit or discharge the cable.

Coming now to the means for manifesting the signals, I preferably employ a transformer $m$ having a secondary winding $o$ in which a recorder $p$ is included. The primary winding $q$ of the transformer is connected, as shown, in circuit with the generator and receives current therefrom. Obviously any electrical manifestation in the primary will be reflected in the secondary. Owing, however, to the delicacy of the apparatus, I have found it advisable and expedient to compensate in the transformer for the action of the series coil $c^1$ on the coil $l$. I have therefore provided in the transformer a compensating coil $r$ connected in circuit with the cable coil $l$ and to ground at $s$. This coil constitutes the compensating coil and is so proportioned as to compensate for or correct the effect due to the action of the coil $c^1$ on the coil $l$. It will therefore be observed that my invention naturally divides itself into several branches.

I provide a source of constant electromotive force added to a circuit in which there is a series coil wound about a magnetic field in which is a member with such relative movement between them that any change of the magnetic induction produces a still greater change in the same direction as the original change and brings about that change by acting upon the magnetic flux.

By relative movement above referred to is meant any change of position of the armature with respect to the magnetic circuit which also includes the core of iron wires. The greater change above referred to is in the core $b$ and not in the spool or the transformer $m$, and the greater change of magnetic flux is brought about by the electromotive force which the original electric current in the coil $i$ produces in the armature $a$. I further may bring the magnetic field into a state of receptivity by bringing it to a non-hysteretic condition. I further may provide means whereby the current delivered by the apparatus will be transformed and received with a correction coil for compensating for the inductive effect of the coil $c^1$ on the coil $l$, but may take off signals in any other manner.

In the accompanying drawing $j$ represents the cable circuit, $x$ the multiplying circuit, $y$ the exciting circuit and $w$ the recording circuit. I have also shown in Fig. 2 means for rotating the armature or movable coil $a$ which consists of an electric motor $n$ directly coupled to the shaft $n^2$ of said coil or armature and by which the said coil or armature is rotated.

Having fully described my invention, what I claim as new and desire to secure by Letters Patent, is:—

1. In an apparatus of the character described, the combination of a magnetic field, an electric circuit having therein in series a source of constant electromotive force, a current delivery device in the magnetic field with means for producing such relative movement between the magnetic field and the current delivery device, as to produce in the electric circuit a substantially equal and opposite electromotive force to the constant electromotive force and a conductor in inductive relation with the magnetic field and in which the change of current flowing due to any change of induction will cause a still greater change in the electric circuit in the same direction.

2. In an apparatus of the character described, the combination of a magnetic field, an electric circuit having therein in series a source of constant electromotive force, a current delivery device in the magnetic field having a commutator and brushes with means for producing such relative movement between the magnetic field and the current delivery device, as to produce in the electric circuit a substantially equal and opposite electromotive force to the constant electromotive force and a conductor in inductive relation with the magnetic field and in which the change of current flowing due to any change of induction will cause a still greater change in the electric circuit in the same direction.

3. In an apparatus of the character described, the combination of a magnetic field an electric current influencing the said magnetic field and in which the change of current flowing due to any change of induction will cause a still greater change of induction in the magnetic field in the same direction, a second conductor in inductive relation with the first mentioned conductor and a transformer the secondary of which is in series with the said second conductor in such a manner that the inductive effect in the secondary of the transformer is substantially equal and opposite to that in the second conductor influencing the magnetic field.

4. In an apparatus of the character described, the combination of a magnetic field an electric circuit influencing the said magnetic field and in which the change of current flowing due to any change of induction will cause a still greater change of induction in the magnetic field in the same direction, a second conductor in inductive relation with the first mentioned conductor, a current delivery device having a commutator and brushes so that a relative movement between the magnetic field and the current delivery device may be maintained and the proper multiplication achieved, and a transformer, the secondary of which is in series with the said second conductor in such a manner that the inductive effect in the secondary of the transformer is substantially equal and opposite to that in the second conductor influencing the magnetic field.

5. In an apparatus of the character described, the combination of a magnetic field an electric circuit influencing the said magnetic field in which is included a source of constant electromotive force, and in which the change of current flowing due to any change of induction will cause a still greater change of induction in the magnetic field in the same direction, a second conductor in inductive relation with the first mentioned conductor, a current delivery device, said current delivery device being in circuit with said first named conductor and presenting an electromotive force substantially equal and opposite to the constant electromotive force in said conductor, and a transformer, the secondary of which is in series with the said second conductor in such a manner that the inductive effect in the secondary of the transformer is substantially equal and opposite to that in the second conductor influencing the magnetic field.

6. In an apparatus of the character described, the combination of a magnetic field an electric circuit influencing the said magnetic field in which is included a source of constant electromotive force, and in which the change of current flowing due to any change of induction will cause a still greater change of induction in the magnetic field in the same direction, a second conductor in inductive relation with the first mentioned conductor, a current delivery device having a commutator and brushes so that a relative movement between the magnetic field and the current delivery device may be maintained and the proper multiplication achieved, said current delivery device being in circuit with said first named conductor and presenting an electromotive force substantially equal and opposite to the constant electromotive force in said conductor, and a transformer, the secondary of which is in series with the said second conductor in such manner that the inductive effect in the secondary of the transformer is substantially equal and opposite to that in the second conductor influencing the magnetic field.

7. The combination with means for producing a magnetic field, of means for creating magnetic induction therein and means for diminishing the hysteretic effect therein, comprising means for impressing a changing current on the material of said field thus producing an effect at an angle to the effect produced by the said means for creating the magnetic field, and a moving coil with means for moving the same, so that the magnetic induction passing through said moving coil is changed by said movement and the mechanical energy imparted to said moving coil is transformed into electrical energy in any electrical circuit, of which said moving coil forms a part.

8. In an apparatus of the character described, the combination of a magnetic field and means for diminishing the hysteretic effect therein, comprising means for impressing a changing current on the material of said field, an electric circuit having therein in series a source of constant electromotive force, a current delivery device in the magnetic field with means for producing such relative movement between the magnetic field and the current delivery device, as to produce in the electric circuit, a substantially equal and opposite electromotive force to the constant electromotive force and a conductor in inductive relation with the magnetic field and in which the change of current flowing due to any change of induction will cause a still greater change in the electric circuit in the same direction.

9. In an apparatus of the character described, the combination of a magnetic field and means for diminishing the hysteretic effect therein, comprising means for impressing a changing current on the material of said field, an electric circuit having therein in series a source of constant electromotive force, a current delivery device in the magnetic field having a commutator and brushes with means for producing such relative movement between the magnetic field and the current delivery device, as to produce in the electric circuit a substantially equal and opposite electromotive force to the constant electromotive force and a conductor in inductive relation with the magnetic field and in which the change of current flowing due to any change of induction will cause a still greater change in the electric circuit in the same direction.

10. In an apparatus of the character described, the combination of a magnetic field and means for diminishing the hysteretic effect therein, comprising means for impressing a changing current on the material of said field an electric circuit influencing the said magnetic field and in which the change of current flowing due to any change of induction will cause a still greater change of induction in the magnetic field in the same direction, a second conductor in inductive relation with the first mentioned conductor and a transformer, the secondary of which is in series with the said second conductor in such a manner that the inductive effect in the secondary of the transformer is substantially equal and opposite to that in the second conductor influencing the magnetic field.

11. In an apparatus of the character described, the combination of a magnetic field and means for diminishing the hysteretic effect therein, comprising means for impressing a changing current on the material of said field, an electric circuit influencing the said magnetic field and in which the change of current flowing due to any change of induction will cause a still greater change of induction in the magnetic field in the same direction, a second conductor in inductive relation with the first mentioned conductor, a current delivery device having a commutator and brushes so that a relative movement between the magnetic field and the current delivery device may be maintained and the proper multiplication achieved, and a transformer, the secondary of which is in series with the said second conductor in such a manner that the inductive effect in the secondary of the transformer is substantially equal and opposite to that in the second conductor influencing the magnetic field.

12. In an apparatus of the character described, the combination of a magnetic field and means for diminishing the hysteretic effect therein, comprising means for impressing a changing current on the material of said field, an electric circuit influencing the said magnetic field in which is included a source of constant electromotive force, and in which the change of current flowing due to any change of induction will cause a still greater change of induction in the magnetic field in the same direction, a second conductor in relation with the first mentioned conductor, a current delivery device, said current delivery device being in circuit with said first named conductor and presenting an electromotive force substantially equal and opposite to the constant electromotive force in said conductor, and a transformer, the secondary of which is in series with the said second conductor in such manner that the inductive effect in the secondary of the transformer is substantially equal and opposite to that in the second conductor influencing the magnetic field.

13. In an apparatus of the character described, the combination of a magnetic field and means for diminishing the hysteretic effect therein, comprising means for impressing a changing current on the material of said field, an electric circuit influencing the said magnetic field in which is included a source of constant electromotive force, and in which the change of curent flowing due to any change of induction will cause a still greater change of induction in the magnetic field in the same direction, a second conductor in relation with the first mentioned conductor, a current delivery device having a commutator and brushes so that a relative movement between the magnetic field and the current delivery device may be maintained and the proper multiplication achieved, said current delivery device being in circuit with said first named conductor and presenting an electromotive force substantially equal and opposite to the constant electromotive force in said conductor, and a transformer, the secondary of which is in series with the said second conductor in such manner that the inductive effect in the secondary of the transformer is substantially equal and opposite to that in the second conductor influencing the magnetic field.

14. In an apparatus of the character described, the combination of a magnetic field, an electric circuit having therein in series a source of constant electromotive force, a current delivery device in the magnetic field with means for producing such relative movement between the magnetic field and the current delivery device as to produce in the electric circuit a substantially equal and opposite electromotive force to the constant electromotive force and a conductor in inductive relation with the magnetic field and in which the change of current flowing due to any change of induction will cause a still greater change in the electric circuit in the same direction, and a circuit in inductive relation to the magnetic field and supplied with current from a constant source of electromotive force.

15. In an apparatus of the character described, the combination of a magnetic field and means for diminishing the hysteretic effect therein, comprising means for impressing a changing current on the material of said field, an electric circuit having therein in series a source of constant electromotive force, a current delivery device in the magnetic field with means for producing such relative movement between the magnetic field and the current delivery device as to produce in the electric circuit a substantially equal and opposite electromotive force to the constant electromotive force and a conductor in inductive relation with the magnetic field and in which the change of current flowing due to any change of induction will cause a still greater change in the electric circuit in the same direction, and a circuit in inductive relation to the magnetic field supplied with current from the constant series of electromotive force.

16. In an apparatus of the character described, the combination of a magnetic field an electric circuit influencing the said magnetic field and in which the change of current flowing due to any change of induction will cause a still greater change of induction in the magnetic field in the same direction, a second conductor in inductive relation with the first mentioned conductor and a transformer, the secondary of which is in series with the said second conductor in such manner that the inductive effect in the secondary of the transformer is substantially equal and opposite to that in the second conductor influencing the magnetic field, and a circuit in inductive relation to the magnetic field and supplied with current from a constant source of electromotive force.

17. In an apparatus of the character described, the combination of a magnetic field an electric circuit influencing the said magnetic field in which is included a source of constant electromotive force, and in which the change of current flowing due to any change of induction will cause a still greater change of induction in the magnetic field in the same direction, a second conductor in relation with the first mentioned conductor, a current delivery device having a commutator and brushes so that a relative movement between the magnetic field and the current delivery device may be maintained and the proper multiplication achieved, said current delivery device being in circuit with said first named conductor and presenting an electromotive force substantially equal and opposite to the constant electromotive force in said conductor, and a transformer, the secondary of which is in series with the said second conductor in such manner that the inductive effect in the secondary of the transformer is substantially equal and opposite to that in the second conductor influencing the magnetic field, and a circuit in inductive relation to the magnetic field and supplied with current from the constant series of electromotive force.

18. In an apparatus of the character described, the combination of a magnetic field and means for diminishing the hysteretic effect therein, comprising means for impressing a changing current on the material of said field, an electric circuit influencing the said magnetic field in which is included a source of constant electromotive force, and in which the change of current flowing due to any change of induction will cause a still greater change of induction in the magnetic field in the same direction, a second conductor in relation with the first mentioned conductor, a current delivery device having a commutator and brushes so that a relative movement between the magnetic field and the current delivery device may be maintained and the proper multiplication achieved, said current delivery device being in circuit with said first named conductor and presenting an electromotive force substantially equal and opposite to the constant electromotive force in said conductor, and a transformer, the secondary of which is in series with the said second conductor in such manner that the inductive effect in the secondary of the transformer is substantially equal and opposite to that in the second conductor influencing the magnetic field, and a circuit in inductive relation to the magnetic field and supplied with current from the constant series of electromotive force.

19. The combination with means for producing a magnetic field, of means for changing the magnetic induction by a changing electric current, and a moving coil with means for moving the same, so that the magnetic induction passing through said moving coil is changed by said movement and the mechanical energy imparted to said moving coil is transformed into electrical energy in any electrical circuit, of which said moving coil forms a part.

20. The combination of means for creating a magnetic field, means for changing the hysteretic effect therein, comprising means for impressing a changing current influence upon the material of said field producing an effect at an angle to the effect produced by the means for creating the magnetic field, and a moving coil with means for moving the same so that the magnetic induction passing through said moving coil is changed by said movement and the mechanical energy imparted to said moving coil is transformed into electrical energy in any electrical circuit, of which said moving coil forms a part.

21. The combination of means for producing a magnetic field, and means for diminishing any hysteretic effect therein, comprising means for producing a changing current in the material of the field, thus producing magnetic induction in said field which has a component at right angles to the magnetic induction of said field, and a moving coil with means for moving the same, so that the magnetic induction passing through said moving coil is changed by said movement and the mechanical energy imparted to said moving coil is transformed into electrical energy in any electrical circuit, of which said moving coil forms a part.

In testimony that I claim the foregoing as my invention I have signed my name in presence of the subscribing witnesses this 15th day of October 1907.

THOMAS C. COYKENDALL.

Witnesses:
M. E. DOODY,
C. E. MULREANY.

---

Copies of this patent may be obtained for five cents each, by addressing the "Commissioner of Patents, Washington, D. C."